United States Patent Office 2,755,303
Patented July 17, 1956

2,755,303
POLYMERIZABLE ESTERS

Hermann Schnell and Wilhelm Becker, Leverkusen, Germany, assignors to Farbenfabriken Bayer Aktiengesellschaft, Leverkusen, Germany No Drawing. Application April 8, 1953,
Serial No. 347,612

Claims priority, application Germany April 12, 1952

5 Claims. (Cl. 260—486)

This invention relates to chemical compounds. More particularly, this invention is concerned with readily polymerizable esters and a method of preparing the same.

It is well known to produce unsaturated esters containing free hydroxy groups and capable of undergoing polymerization by partial esterification of polyhydric alcohols with unsaturated acids or by partial alcohol-ester interchange between polyhydric alcohols and low-molecular esters of unsaturated acids. In these reactions, it was customary to use the polyhydric alcohol in excess. This method has the disadvantage that a mixture of compounds differing in the degree of esterification is formed. Moreover, a poor yield is obtained by the known method.

According to the present invention it has surprisingly been found that unsaturated esters containing free hydroxy groups, i. e. partially esterified alcohols, can be obtained by reacting polyhydric alcohols having attached more than two alkylol groups to one carbon atom with unsaturated polymerizable acids or with low-molecular esters of unsaturated acids when an excess of the acid or of the ester over the hydroxy groups to be esterified is used. This discovery could not be expected because in the reaction with saturated acids all hydroxy groups are esterified.

By employing an excess of the unsaturated acids or of their low-molecular esters in accordance with the present invention unsaturated esters containing free hydroxy groups can be produced which are well defined so that it is no longer necessary to separate hydroxy compounds differing in the degree of esterification.

Polyhydric alcohols having attached more than two alkylol groups to one carbon atom which may be used for the invention are trimethylol-methyl-methane, trimethylol-ethyl-methane, trimethylol-propyl-methane etc.

Representative examples of the unsaturated polymerizable acids and esters, respectively, which may be employed include, among others, acrylic and methacrylic acid and the esters of the same with volatile alcohols.

The reaction is carried out in accordance with methods which are per se known in the presence of a stabilizer, such as hydroquinone, methylene blue and the like. The esters formed in the reaction can be purified by extraction or by distillation.

The unsaturated esters of our invention are readily polymerizable substances which undergo polymerization even in the absence of polymerization accelerators upon standing for an extended period or when heated for a short time. The polymers thus obtained are exceedingly hard. Moreover, the esters of our invention may be co-polymerized with a great number of unsaturated substances whereby very hard, insoluble polymers of a network structure and good mechanical qualities are obtainable. The free hydroxy groups contained in the polymers bring about particular properties, such as an outstanding adhesion to porcelain, wood, metals and other materials. For this reason the polymers may find various commercial applications, for instance, in the field of dental products.

The invention is further illustrated by, but not limited to, the following examples in which all parts are by weight.

Example 1

A mixture consisting of 150 parts of trimethylol-ethyl-methane, 1500 parts of methyl-methacrylate, 15 parts of hydroquinone and 20 parts of concentrated sulfuric acid was boiled in a reaction vessel fitted with a fractionating column while purified nitrogen was passed through the mixture. The column was packed with rings made of copper wire net. After a short time had passed, an azeotropic mixture of methyl alcohol and methyl-methacrylate containing 84.5 per cent of methyl alcohol started distilling off at a temperature of 64.2° C. The reaction mixture was boiled until the azeotrope had completely passed over (4 to 5 hours). Now the surplus methyl-methacrylate was distilled from the reaction mixture at 75° C. in vacuo with a flow-evaporator. The high boiling residue was extracted several times with 12 per cent sodium hydroxide solution until the soda lye was no longer discolored. After being washed with water the reaction product, thus freed from hydroquinone, was a colorless or slightly yellowish liquid, which upon standing or more rapidly on heating polymerized to form hard polymers. At temperatures below zero or in the presence of stabilizers the product was stable for an extended period. The yield was 280 parts.
Analysis of the product showed:

| | saponification number | molecular weight determined by hydrogenation (hydrogen absorption) |
|---|---|---|
| found | 403 | 270 |
| calculated for trimethylol-propane-di-methacrylate | 415 | 270 |
| calculated for trimethylol-propane-tri-methacrylate | 498 | 338 |

The product, therefore, was trimethylol-propane-dimethacrylate of the formula:

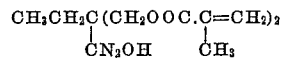

Example 2

A mixture consisting of 250 parts of trimethylol-ethyl-methane, 410 parts of methacrylic acid, 20 parts of p-toluene sulfonic acid, 1400 parts of benzene and 1 part of methylene blue was boiled in a reaction vessel provided with a fractionating column. The azeotropic mixture of benzene and water formed in the reaction passed through the column. The azeotrope was condensed, the water removed by means of a water trap and the benzene recycled to the reaction vessel. After a period of 6 to 10 hours no more water collected in the trap. The reaction mixture was cooled and washed with soda lye and then with water. Now the benzene was distilled from the mixture at 40–60° C. in vacuo with the aid of a flow-evaporator. On addition of 100 parts of water the residue was subjected to a steam distillation in a high vacuum at 15–20° C. The stabilizer was removed from the reaction product by activated coal. The yield was 450 to 490 parts of a colorless to slightly yellowish liquid showing the same analysis and properties as the product described in Example 1. The product, therefore, was trimethylol-propane-dimethacrylate of the formula:

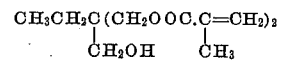

Example 3

A mixture consisting of 150 parts of trimethylol-ethyl-methane, 1500 parts of methyl-acrylate, 50 parts of hydroquinone and 15 parts of concentrated sulfuric acid was treated as described in Example 1. The reaction was complete when the azeotrope methyl acrylate-methyl alcohol (containing 54 per cent of methyl alcohol) had ceased to pass over at 62.5° C. The yield was 200 parts of a slightly yellowish liquid. The product was highly susceptible to polymerization. Saponification number found: 452; saponification number calculated for trimethylol-propane-diacrylate: 463. The product therefore had the formula:

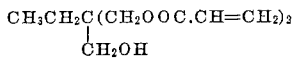

*Example 4*

In accordance with the procedure described in Example 2, 240 parts of trimethylol-ethane-dimethacrylate of the formula

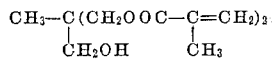

were obtained from a mixture consisting of 120 parts of trimethylol-methyl-methane, 300 parts of methacrylic acid, 15 parts of p-toluene-sulfonic acid, 1 part of methylene blue, 5 parts of hydroquinone and 1000 parts of benzene by azeotropic esterification. The product was a colorless to slightly yellowish liquid. Refractive index: $n_D^{20}$: 1,4720. Saponification number found: 445; saponification number calculated 437.

We claim:

1. A process for producing unsaturated polymerizable esters containing at least one primary hydroxy group which comprises heating polyhydric alcohols having attached three alkylol groups to one carbon atom with a member selected from the group consisting of acrylic acid, methacrylic acid and the low-molecular esters of the same, the acid compound being used in excess over the hydroxy groups to be esterified.

2. The process of claim 1 wherein the water formed in the reaction is removed by azeotropic distillation.

3. As a new compound trimethylol-propane-dimethacrylate having the formula:

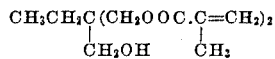

4. As a new compound trimethylol-propane-diacrylate having the formula:

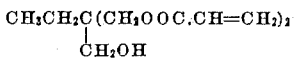

5. As a new compound trimethylol-ethane-dimethacrylate having the formula:

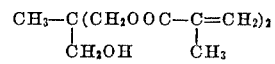

References Cited in the file of this patent
UNITED STATES PATENTS

| | | |
|---|---|---|
| 2,032,091 | Holt | Feb. 25, 1936 |
| 2,129,722 | Woodhouse | Sept. 13, 1937 |

OTHER REFERENCES

Golant: Chem. Abstracts 46, 9958 (1952).